W. N. WHITELEY.
HARVESTER.
No. 174,041. Patented Feb. 22, 1876.
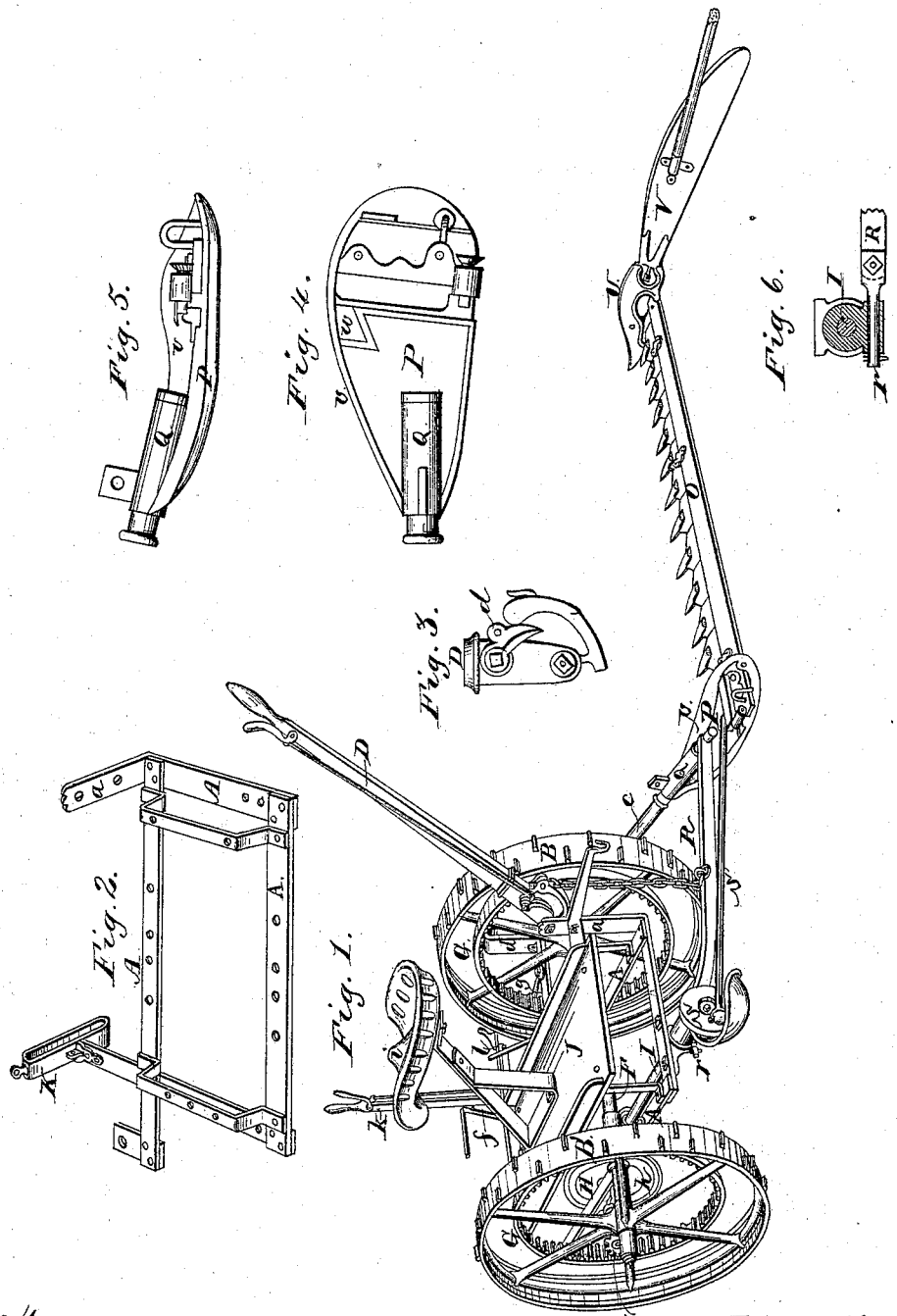
Witnesses
C. Clarence Poole
E. M. Gallaher
Inventor
Wm N Whiteley
By his atty
R D Smith

UNITED STATES PATENT OFFICE.

WILLIAM N. WHITELEY, OF SPRINGFIELD, OHIO.

IMPROVEMENT IN HARVESTERS.

Specification forming part of Letters Patent No. 174,041, dated February 22, 1876; application filed April 23, 1874.

*To all whom it may concern:*

Be it known that I, WILLIAM N. WHITELEY, of Springfield, in the county of Clarke and State of Ohio, have invented a new and useful Improvement in Mowing Machines; and I do hereby declare the following to be a full, clear, and exact description of the same, reference being had to the accompanying drawings, in which—

Figure 1 is a perspective view of my machine. Fig. 2 is a perspective view of the main frame of the same with all removable parts detached. Fig. 3 is an elevation of the segment-head of the lifting-lever with its latch. Fig. 4 is a plan of the inner shoe. Fig. 5 is an inner side elevation of the same. Fig. 6 is a cross-section of the crank-shaft box through the lateral-brace swivel.

This invention relates to that class of harvesters known as two-wheeled double-jointed machines.

That others may clearly understand my invention, I will particularly describe it.

The main frame is rectangular, and is composed of bars A A of wrought-iron, firmly bolted or riveted together at their intersections. The bar A which extends across and forms the front of the said frame, extends laterally beyond the inner side bar, and in front of the inner supporting-wheel B, to receive the attachment for the drag-bar C. The corresponding bar across the rear of the main frame has its inner end turned upward, as at a, to form a fulcrum for the segment-lever D, whereby the inner shoe and cutting apparatus may be raised from the ground, whenever desired, by the driver. The fulcrum a is rendered more rigid than heretofore, from the fact that the stress upon it is in the direction of the length of the fulcrum-bar, and is, therefore, brought directly upon the frame without any intermediate spring or flexion. It may also be conveniently braced and stiffened by the arm E, from the rear end of which the inner shoe is suspended when the machine is arranged for reaping and has the platform and raking mechanism attached.

At the top of the fulcrum a ratchet-teeth may be placed to engage with a detent-pawl, d, placed on the side of the lever D, and withdrawn as required by means of a hand-piece, near the extremity of said lever, so that the inner shoe, &c., may be raised and maintained at any desired height from the ground, instead of being held by an adjustable stop and holder, as heretofore.

The main frame A is supported by two supporting and driving wheels, B B', mounted upon a stationary axle, F. Said wheels are provided with internally-geared rims, G G, which mesh with and actuate pinions g g, on a counter-shaft, H, whereby motion is communicated by bevel-wheel h to the cutters' crank-shaft I.

A foot-board, J, is mounted upon short legs above the main frame A, to support the driver and his seat i while the machine is being operated. Secured to the inner end of the front bar A of the main frame is a plate, K, folded so as to form a long vertical slot to receive the front end of the drag-bar C, and permit the same to be moved up and down, as may be required, to adjust the points of the guards and cutters.

Said drag-bar is connected at its front end with and controlled by a crank-shaft, L, and connecting-rod l, said rock-shaft being operated and controlled by a hand-lever, k, with a latch-pawl engaging with the segment-rack f.

The cutting apparatus O is secured at its inner end to a shoe, P, which slides upon the ground while the machine is used for mowing.

At the front end of said shoe there is a tubular sleeve or bearing, Q, to receive the rear end of the drag-bar C, which thereby has a rigid connection with said shoe, so far as lateral strains are concerned, but may have a free rotary movement thereon as an axis.

The rear end of the drag-bar C passes through the end of the lateral brace R, to form the outer joint of said brace. The inner end of said brace R is jointed to the main frame, forward of the cutters' crank-wheel S, by means of a swivel, r. The lateral brace R is, therefore, entirely in front of the crank S and pitman s and its connection with the inner shoe P.

The swivel-joint r of the lateral brace R is in a lug or enlargement, Y, made on the crank-shaft box, beneath the neck thereof, in rear of its connection to the transverse bar A of the main frame. Said lug Y is perforated horizontally and a swivel-pin, $r$, is fitted therein, said pin having a head at one end to which the end of the lateral brace R is jointed. This forms an easy and ready means of connecting the lateral brace with a swivel-connection, and placing the same in front of the crank and pitman, so that said connections are not only strengthened, but the pitman is protected by the lateral brace from contact with objects upon the ground, which otherwise might embarrass its movements.

At the outer end of the cutting apparatus there is a shoe, U, to which the truck-clearer V is hinged.

The shoe P is connected with a flange or rim, $v$, turned up along its outer edge and made continuous from front to rear end, with an orifice for the passage of the cutter. This flange or rim not only stiffens the shoe to some extent, but it forms a good and convenient foundation for the lower edge of the metallic shield, which is attached to the front of the drag-bar and passes around the outer side of flange $v$, and is secured to the rear end of bridge when the machine is used for reaping.

At the bottom of the orifice in the flange $v$, through which the cutters move, is a recess for the reception of a steel ledger-plate, $w$, against the edge of which the end cutter acts.

Having described my invention, what I claim is—

1. Combined with the drag-bar C, adjustable up and down at its front end, the lateral brace R, jointed to the rear end of said drag-bar, the shoe P, constructed with a tubular sleeve-box, Q, at its front end fitted to receive the rear end of said drag-bar and move freely thereon as an axis.

2. A rectangular main frame, constructed of wrought-metal bars bolted together at the corners, the rear transverse bar, turned up at its inner end and serrated to form a fulcrum and ratchet for the lever D, as set forth.

W. N. WHITELEY.

Witnesses:
C. C. POOLE,
R. D. O. SMITH.